(12) United States Patent
Mason

(10) Patent No.: US 11,472,454 B1
(45) Date of Patent: Oct. 18, 2022

(54) POSITIVE TRAIN CONTROL SIMULATION SYSTEM WITH EMERGENCY AND HORN APPLICATIONS AND METHOD THEREFOR

(71) Applicant: BNSF Railway Company, Fort Worth, TX (US)

(72) Inventor: Nicholas Glen Mason, Garden City, MO (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 17/698,559

(22) Filed: Mar. 18, 2022

Related U.S. Application Data

(63) Continuation-in-part of application No. 17/698,321, filed on Mar. 18, 2022.

(51) Int. Cl.
    *B61L 27/60* (2022.01)
    *B61L 23/34* (2006.01)
    *B61L 27/20* (2022.01)

(52) U.S. Cl.
    CPC ............... *B61L 27/60* (2022.01); *B61L 23/34* (2013.01); *B61L 27/20* (2022.01)

(58) Field of Classification Search
    CPC ........... B61L 27/60; B61L 27/20; B61L 23/34
    See application file for complete search history.

(56) References Cited

U.S. PATENT DOCUMENTS

| | | | | |
|---|---|---|---|---|
| 5,967,620 A | * | 10/1999 | Truglio | B60T 13/665 303/3 |
| 6,325,464 B2 | * | 12/2001 | Truglio | B60T 13/665 303/7 |
| 6,457,782 B1 | * | 10/2002 | Truglio | B60T 13/665 303/7 |

(Continued)

FOREIGN PATENT DOCUMENTS

| | | |
|---|---|---|
| CN | 205750519 U | 11/2016 |
| CN | 208506591 U | 2/2019 |

OTHER PUBLICATIONS

Meyers et al, Risk Assessment of Positive Train Control by Using Simulation of Rare Events, Transportation Research Record: Journal of the Transportation Research Board, No. 2289, Google, pp. 34-41. (Year: 2012).*

(Continued)

*Primary Examiner* — Russell Frejd
(74) *Attorney, Agent, or Firm* — Enrique Sanchez; Whitaker Chalk Swindle & Schwartz PLLC

(57) ABSTRACT

A system and method for simulating positive train control (PTC) systems in a local and controlled environment using software and hardware. The system can simulate various functionalities of the PTC system in the environment using software and hardware components. The system can instruct the software of a train management computer (TMC) to control electromechanical valves to simulate air compression on brake pipes in response to the PTC system executing a penalty on the locomotive. The system can display statuses (Continued)

of various systems on the locomotive to a user using a cab display unit (CDU). The system can control the software and hardware components to simulate warnings and actions from the PTC system allowing locomotive engineers and conductors to experience the PTC system for optimum training.

25 Claims, 9 Drawing Sheets

(56) References Cited

U.S. PATENT DOCUMENTS

| | | |
|---|---|---|
| 9,283,945 B1 | 3/2016 | Kernwein et al. |
| 9,828,013 B2 | 11/2017 | Shubs, Jr. |
| 9,873,443 B2 | 1/2018 | Sleasman et al. |
| 10,173,703 B2 | 1/2019 | Wait et al. |
| 2019/0120724 A1 | 4/2019 | Ferrell et al. |
| 2020/0156678 A1 | 5/2020 | Moss |
| 2020/0189635 A1 | 6/2020 | Hurst |

OTHER PUBLICATIONS

Zhao et al, Positive Train Control with Dynamic Headway Based on an Active Communication System, IEEE Transactions on Intelligent Transportation Systems, vol. 16, No. 6, pp. 3095-3103. (Year: 2015).*
Pate et al, Positive Train Control Braking Algorithm Evaluation Methodology Enhancement, Transportation Technology Center, Google, pp. 1-63. (Year: 2020).*
U.S. Department of Transportation, PTC Test Bed Siding Signal Upgrade at the Transportation Technology Center, May 31, 2018.
Weinstein, Margery, BNSF Railway Is on Board with Topnotch Training, Feb. 28, 2018.
PST, PTC—Postive Train Control Training and Simulation to Help Meet FRA Railroad Training Requirements, Aug. 3, 2020.
Princeton Consultants, SATS: An advanced signal design system and simulation tool, Dec. 31, 2019.
Wabtec, TMDS, Aug. 3, 2020.

* cited by examiner

POSITIVE TRAIN CONTROL SIMULATION SYSTEM WITH EMERGENCY AND HORN APPLICATIONS AND METHOD THEREFOR

CROSS-REFERENCE TO RELATED APPLICATIONS

The present application is a Continuation-in-Part of U.S. patent application Ser. No. 17/698,321, filed 2022 Mar. 18, the entirety of which is hereby incorporated by reference for all purposes.

TECHNICAL FIELD

The present disclosure relates generally to a simulation of locomotive emergency and horn enforcement events, and more specifically to systems and methods for simulating physical and electrical characteristics corresponding to Positive Train Control emergency and horn enforcement events.

BACKGROUND

Positive Train Control (PTC) systems use communication-based and processor-based train control technology to reliably and functionally prevent train-to-train collisions, over-speed derailments, incursions into established work zones, and movements of trains through switches left in the wrong position. PTC systems harmonize interoperability between electrical and mechanical systems to act in moments when a locomotive disregards a safety plan. For example, the PTC system operates in response to identifying speed of the locomotive is greater than the route speed allows enabling a penalty to the locomotive by applying the brakes. The Federal Railroad Administration mandates PTC systems operating on every mile of railroad meaning every locomotive on the railroad includes a PTC system.

Teaching how a PTC system operates on a locomotive currently lacks any ability to simulate the system components. While training on a locomotive with the PTC system is ideal, this is unlikely because of the inability for a trainer to obtain the locomotive for the time to properly train the upcoming engineers and conductors. Training engineers and conductors can take weeks, months, even years, so removing a locomotive from use can create dissatisfactory efficiency. Additionally, because trainees focusing on becoming an engineer or a conductor cannot practice in a practical environment, the trainees receive insufficient training. Engineers and conductors without proper training with the PTC system can frequently trigger the PTC system on the locomotive by traveling with unsafe locomotive handling. While the PTC system ensures for enhanced safety the risk continues for train derailments and train-to-train collisions.

SUMMARY

The present disclosure achieves technical advantages as a system and method for simulating PTC systems in a local environment using software and hardware, removing the training program from using an actual locomotive. The system can simulate various functionalities of the PTC system in a classroom environment using software and hardware components. For example, the system can couple the software of a train management computer (TMC) to electromechanical valves to simulate air compression on brake pipes in response to the PTC system executing a penalty on the locomotive. The system can display statuses of various systems on the locomotive to a user using a cab display unit (CDU). For example, the TMC enables the hardware and software of the system to communicate information relevant to analyzing warnings from the PTC system. The system can control the software and hardware components to simulate warnings and actions from the PTC system allowing trainees to experience the PTC system for optimum training.

The present disclosure solves the technological problems of providing insufficient training for interacting with the PTC system and restricting trainees from experiencing the PTC system in action by simulating warnings and actions from the PTC system using stand-alone system components, which removes the locomotive from at least some of the training program. By removing the locomotive from at least some of the training program yields flexibility to the instructors while optimizing education for the trainees. Additionally, removing the locomotive from some of the training saves time for the training program while enabling immediate feedback to handling the locomotive in response to the PTC system warnings. Separating at least the initial PTC training for the novice engineers and conductors from operating on locomotives also minimizes liability and risk, such as breaking components on the locomotive and potentially causing a hazardous safety environment.

The present disclosure provides a technical solution to the technical problem by providing software and hardware components for instructional purposes. Particularly, the present disclosure focuses on optimizing training conditions for interacting with the PTC system. In a real-world environment, the PTC system can transmit warnings and instructions to the locomotive instructing it how to respond to certain situations. The present disclosure provides control mechanisms interacting between software and hardware components to simulate a locomotive environment. The simulated locomotive environment enables a user to practice interacting with the PTC system without physical repercussions, such as the PTC system applying the brakes to the locomotive. The present disclosure enables users to interact with locomotive components in a system coupling components corresponding to the PTC system in a classroom environment.

It is an object of the invention to provide a method for simulating an emergency application from a PTC. It is a further object of the invention to provide a system for simulating an emergency application from a PTC. It is a further object of the invention to provide a method for simulating a horn enabled application from a PTC. It is a further object of the invention to provide a system for simulating a horn application from a PTC. These and other objects are provided by at least the following embodiments.

In one embodiment, a method for simulating an emergency condition in a PTC system, comprising: receiving an instruction corresponding to a train emergency condition; supplying compressed air to one or more pressure transducers at a first pressure for a penalty period; converting the first pressure to a second pressure at a penalty rate to simulate the train emergency condition; energizing an emergency magnetic valve when a second cutout switch is closed; venting the compressed air to reduce the second pressure. Wherein the first pressure can be 90 psi, and wherein the second pressure can be 58 psi. Wherein the penalty rate is based on a service rate. Wherein the method further comprising energizing an emergency magnetic valve. Wherein the method further comprising energizing a pulse conversion relay, a penalty magnetic valve, an interval delay relay, and a vent magnetic valve. Wherein the pressure transducers include an equalizer reservoir pressure transducer and a brake pipe pressure transducer. Wherein the method further comprising activating the equalizer reservoir pressure transducer and the brake pipe pressure transducer. Wherein the method further comprising deenergizing the pulse conversion relay to supply a first voltage to the interval delay relay. Wherein the method further comprising providing a second voltage to the vent magnetic valve from the interval delay relay for a time duration. Wherein the first voltage and the second voltage can be 74 volts. Wherein the method further comprising deenergizing the penalty magnetic valve to initialize the second pressure.

In another embodiment, a system for simulating an emergency condition in a PTC system, comprising: an internal delay relay operably coupled to a PTC terminal board; a pulse conversion relay operably coupled to the internal delay relay and the PTC terminal board; an air compressor operably coupled to the pulse conversion relay; a penalty magnetic valve operably coupled to the air compressor; at least one brake pipe pressure transducer operably coupled to the penalty magnetic valve; a brake cylinder pressure transducer operably coupled to the penalty magnetic valve; a vent magnetic valve operably coupled to the penalty magnetic valve and the internal delay relay; an emergency magnetic valve operably coupled to the PTC terminal board; and wherein the system controls compressed air being applied to the at least one brake pipe pressure transducer and the brake cylinder pressure transducer. Wherein the system further comprises: an equalizing reservoir pressure transducer operably coupled to the penalty magnetic valve; and a reservoir operably coupled to the penalty magnetic valve and the emergency magnetic valve. Wherein the air compressor provides compressed air to the brake cylinder. Wherein the compressed air can be 72 psi. Wherein the penalty magnetic valve provides compressed air to the equalizer reservoir and the at least one brake pipe. Wherein the compressed air can be 90 psi when the penalty magnetic valve is active, and wherein the compressed air can be 58 psi when the penalty magnetic valve is inactive. Wherein the vent magnetic valve includes a choke. Wherein the emergency magnetic valve includes an exhaust.

In another embodiment, a method for simulating a horn enabled condition in a PTC, comprising: receiving an instruction corresponding to the horn enabled application; providing a voltage to a horn circuit; and generating an audible sound using a horn based on compressed air released by the horn magnetic valve. Wherein the instruction is a user input. Wherein the instruction is an input from a train management computer (TMC). Wherein the method further comprising energizing a horn magnetic valve.

In another embodiment, a system for simulating a horn enabled condition in a PTC system, comprising: a horn circuit; a horn magnetic valve operably coupled to the horn circuit; a horn circuit operably coupled to a horn display circuit from a horn display circuit, wherein the system controls compressed air being applied to the at least one brake pipe pressure transducer and the brake cylinder pressure transducer. Wherein the system further comprises: a train management computer (TMC) operably coupled to the horn circuit; a switch box operably coupled to the TMC and the horn circuit; at least one terminal board operably coupled to the switch box and the horn circuit, wherein the system controls compressed air being applied to the at least one brake pipe pressure transducer and the brake cylinder pressure transducer.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description, which follow. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can visualize or recognize the members of the genus. Accordingly, these examples should not be construed as limiting the scope of the claims.

Figure 1:
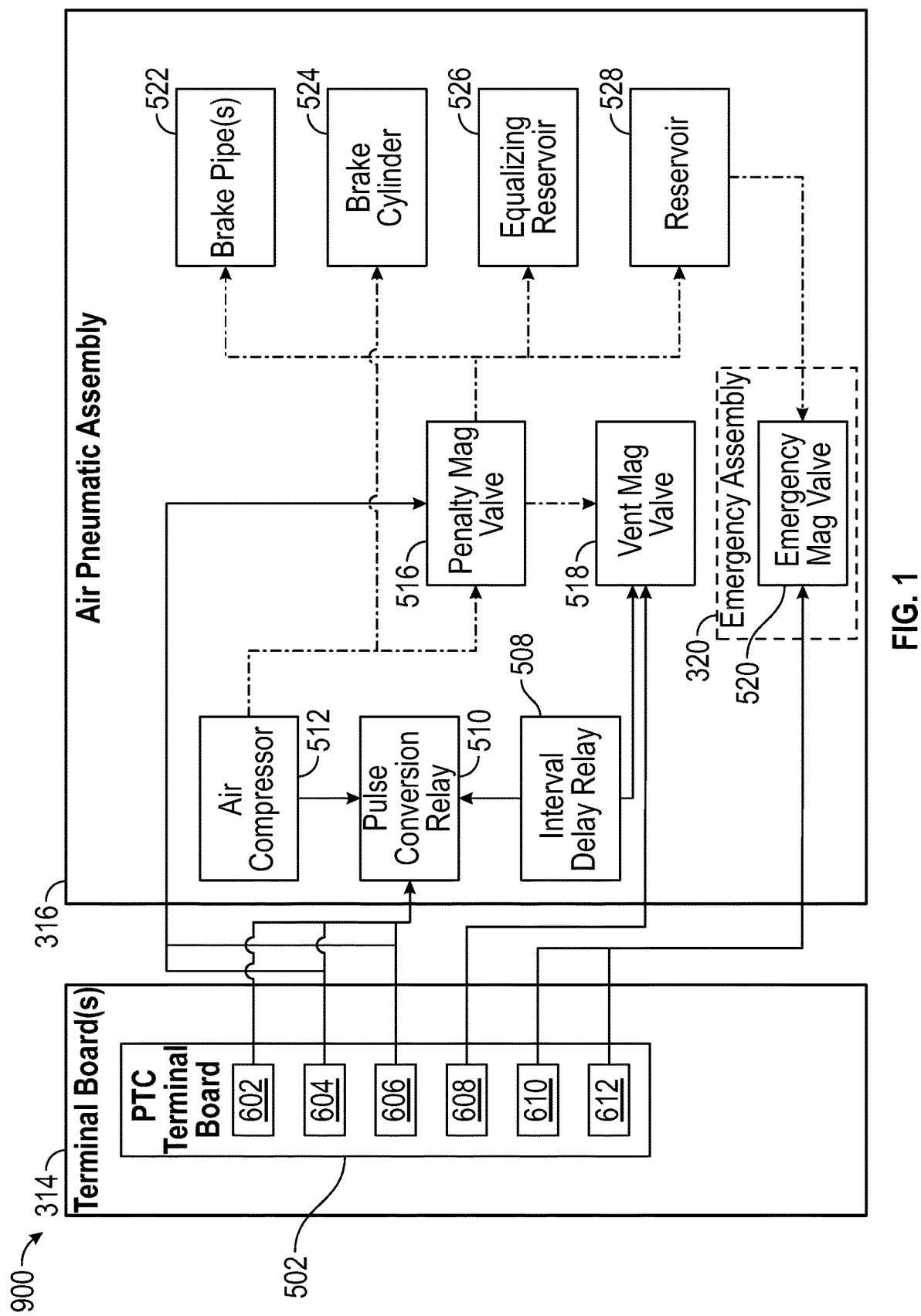
FIG. 1 illustrates a block diagram exemplifying an emergency application assembly, in accordance with one or more embodiments of the present disclosure.

FIG. 1 illustrates a block diagram of an emergency application assembly 900, in accordance with one or more embodiments of the present disclosure. The emergency application assembly 900 can include the terminal board(s) 314 and the PTC terminal board 502. The PTC terminal board 502 can include terminals 602-612. The emergency application assembly 900 can further include the pneumatic air assembly 316, which includes the air penalty assembly 318, the interval delay relay 508, the pulse conversion relay 510, the air compressor 512, the penalty magnetic valve 516, and the vent magnetic valve 518. The penalty assembly 318 can include the brake pipe(s) 522, the brake cylinder 524, the equalizing reservoir 526, and the reservoir 528.

The aforementioned system components can be coupled through electrical or mechanical means. For example, the terminals 602-612 can operably couple with the interval delay relay 508, pulse conversion relay 510, penalty magnetic valve 516, and vent magnetic valve 518 using electrical components. In an example, the electrical components can include conductive wire to transfer electrical signals (e.g., the electrical signals indicating a transfer of information and/or power). In another example, the air compressor 512, the penalty magnetic valve 516, the vent magnetic valve 518, and the penalty assembly 318 can interconnect with mechanical components to transfer compressed air (e.g., designated in FIG. 1 with dash dot lines). In an example, the mechanical components can include rigid or flexible hose, made of various types of material.

The terminal 602, can include provide electrical signals as an output. For example, the electrical signals can include instructions to enable the pulse conversion relay 508. In another example, the terminal 602 can be operably coupled to the pulse conversion relay 508.

The terminal 604, can include provide electrical signals as an output. For example, the electrical signals can include instructions to enable the pulse conversion relay 510 and the penalty magnetic valve 516. In another example, the terminal 604 can be operably coupled to the pulse conversion relay 508 and the penalty magnetic valve 516.

The terminal 606, can include provide electrical signals as an output. For example, the electrical signals can include instructions to enable the pulse conversion relay 510 and the penalty magnetic valve 516. In another example, the terminal 606 can be operably coupled to the pulse conversion relay 508 and the penalty magnetic valve 516.

The terminal 608, can include provide electrical signals as an output. For example, the electrical signals can include instructions to enable the vent magnetic valve 518. In another example, the terminal 608 can be operably coupled to the vent magnetic valve 518.

The terminal 610 can include provide electrical signals as an output. For example, the electrical signals can include instructions to enable the emergency magnetic valve 520. In another example, the terminal 608 can be operably coupled to the emergency magnetic valve 520.

The terminal 612 can include provide electrical signals as an output. For example, the electrical signals can include instructions to enable the emergency magnetic valve 520. In another example, the terminal 608 can be operably coupled to the emergency magnetic valve 520.

Figure 2:
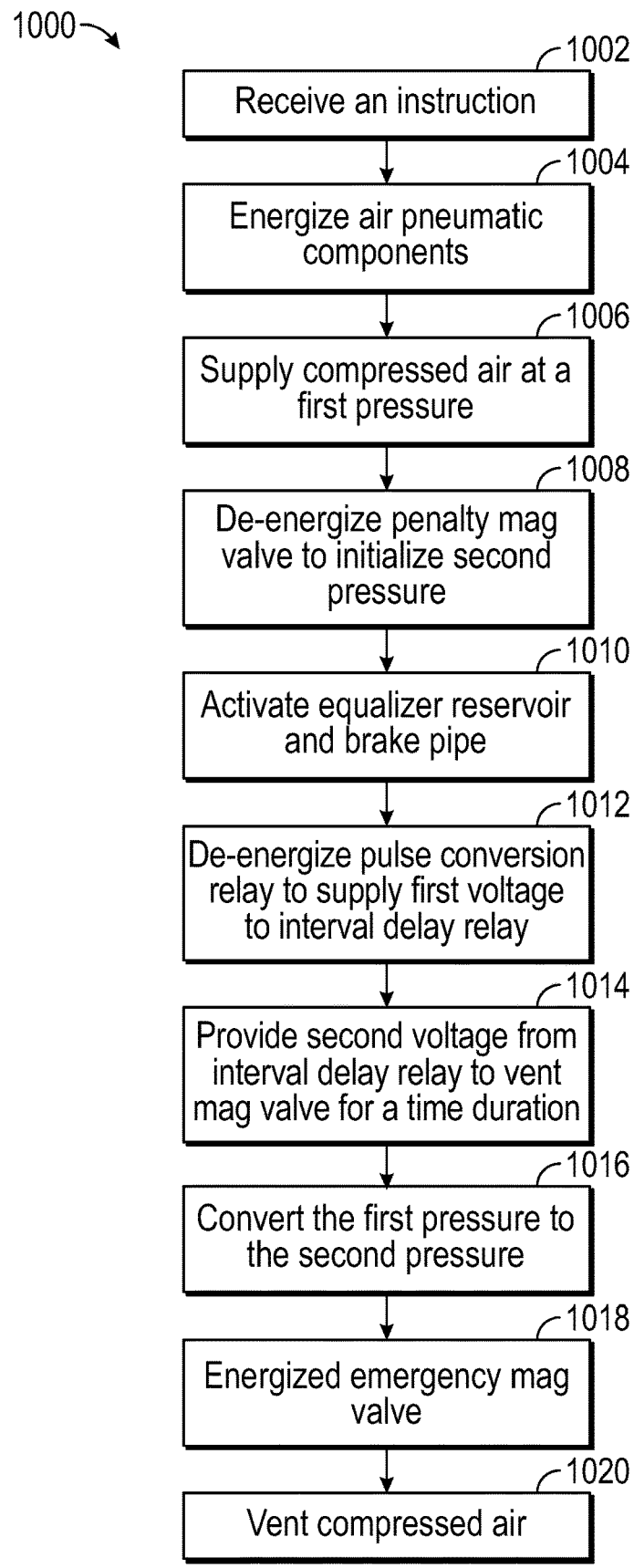
FIG. 2 illustrates a flowchart exemplifying an emergency application control logic, in accordance with one or more embodiments of the present disclosure.

FIG. 2 illustrate a flowchart exemplifying an emergency application control logic 1000, in accordance with one or more embodiments of the present disclosure. The emergency application control logic 1000 can be implemented as an algorithm on a TMC, a machine learning module, a client, a database, or other suitable system. Additionally, the emergency application control logic 1000 can implement or incorporate one or more features of the PTC simulation system 200, including the display management system 202, communication system 204, locomotive control stand system 206, and simulation system 208. The emergency application control logic 1000 can be achieved with software, hardware, firmware, assembly language, machine instructions, an API, a network connection, a network transfer protocol, HTML, DHTML, JavaScript, Dojo, Ruby, Rails, other suitable applications, or a suitable combination thereof.

The emergency application control logic 1000 can leverage the ability of a computer platform to spawn multiple processes and threads by processing data simultaneously. The speed and efficiency of the emergency application control logic 1000 can be greatly improved by instantiating more than one process. However, one skilled in the art of programming will appreciate that use of a single processing thread may also be utilized and is within the scope of the present disclosure.

In one embodiment, commands or data can be received via user input generated on a display or client, such as a screen tap, swipe, mouse click, key press, voice command, or other suitable mechanism. In another embodiment, the inspection commands or data can include inspection data having one or more fields, parameters, characteristics, or metadata, related to an inspection. The emergency application control logic 1000 then proceeds to step 1002.

At step 1002, in one embodiment, the control logic 1000 can receive an instruction. For example, the instruction can correspond to a train penalty condition. In another example, the train penalty condition can correspond to a PTC application for simulation purposes. The control logic 1000 proceeds to step 1004.

At step 1004, in one embodiment, the control logic 1000 can energize air pneumatic components. For example, the air pneumatic components can include a pulse conversion relay, a penalty magnetic valve, an interval delay relay, and a vent magnetic valve. In another example, the control logic 1000 generate electrical signals to energize the air pneumatic components. The control logic 1000 then proceeds to step 1006.

At step 1006, in one embodiment, the control logic 1000 can supply compressed air to the air pneumatic components at a first pressure. For example, the control logic 1000 can supply the compressed air to the air pneumatic components at the first pressure for a penalty period. In an example, the air pneumatic components can include one or more pressure transducers. In an example, the one or more pressure transducers can include an equalizer reservoir pressure transducer and a brake pipe transducer. In another example, the first pressure can be 90 psi. In another example, the penalty period can correspond to a service rate to safely alter compressed air pressure. The control logic 1000 the proceeds to step 1008.

At step 1008, in one embodiment, the control logic 1000 can deenergize the penalty magnetic valve to initialize a second pressure. For example, the second pressure can be 58 psi. In another example, the control logic 1000 can terminate an electrical signal to deenergize the penalty magnetic valve. The control logic 1000 the proceeds to step 1010.

At step 1010, in one embodiment, the control logic 1000 can activate the equalizer reservoir pressure transducer and the brake pipe transducer. For example, the control logic 1000 can generate an electrical signal to activate the equalizer reservoir pressure transducer and the brake pipe transducer. The control logic 1000 the proceeds to step 1012.

At step 1012, in one embodiment, the control logic 1000 can deenergize a pulse conversion relay to supply a first voltage to an interval delay relay. For example, the control logic 1000 can terminate the electrical signal to the pulse conversion relay to deenergize. In another example, the first voltage can be 74 volts. The control logic 1000 the proceeds to step 1014.

At step 1014, in one embodiment, the control logic 1000 can provide a second voltage from the interval delay relay to the vent magnetic valve for a time duration. For example, the control logic 1000 can control a signal from the interval delay relay to the vent magnetic valve for the time duration. In an example, the time duration can be 7 seconds. In another example, the second voltage can be 74 volts. The control logic 1000 the proceeds to step 1016.

At step 1016, in one embodiment, the control logic 1000 can convert the first pressure to the second pressure. For example, convert the first pressure to the second pressure to simulate a train penalty condition. In an example, the control logic 1000 can control the air pneumatic components to reduce the first pressure to the second pressure at the service rate. For example, the service rate can correspond with a pressure change rate from the first pressure to the second pressure based on various mechanical factors. The control logic 1000 proceeds to step 1018.

At step 1018, in one embodiment, the control logic 1000 can energize the emergency magnetic valve. For example, the control logic 1000 generate electrical signals to energize the air pneumatic components. The control logic 1000 proceeds to step 1020.

At step 1020, in one embodiment, the control logic 1000 can vent the compressed air. For example, the control lotic can generate the electrical signals to indicate to the emergency magnetic valve to open, releasing any stored compressed air. In another example, when the control logic 1000 vents the compressed air, a brake system of a locomotive or simulated locomotive engages applying the emergency application.

Figure 3A:
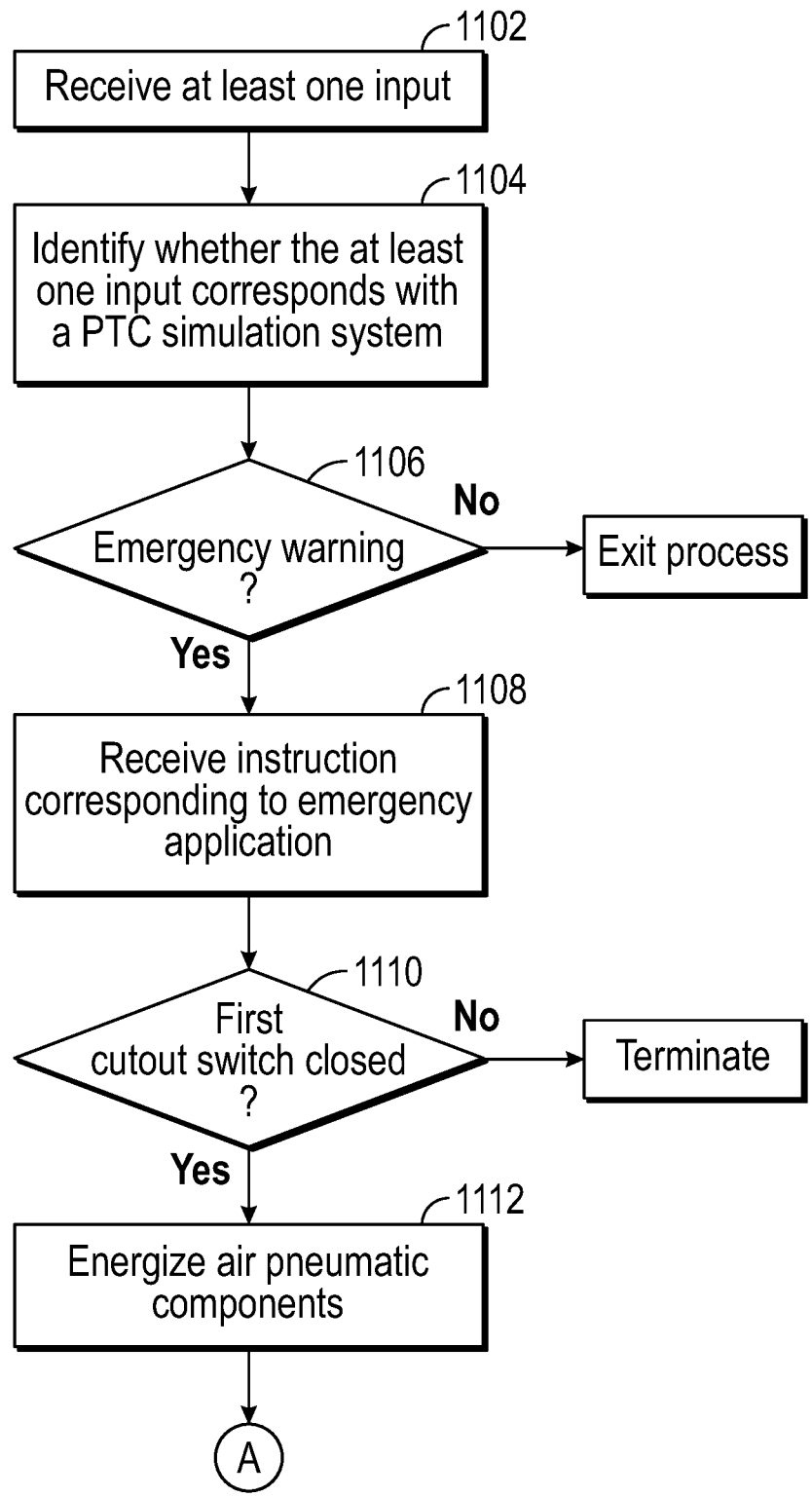
FIG. 3A illustrates a flowchart exemplifying an emergency application control logic, in accordance with one or more embodiments of the present disclosure.
Figure 3B:
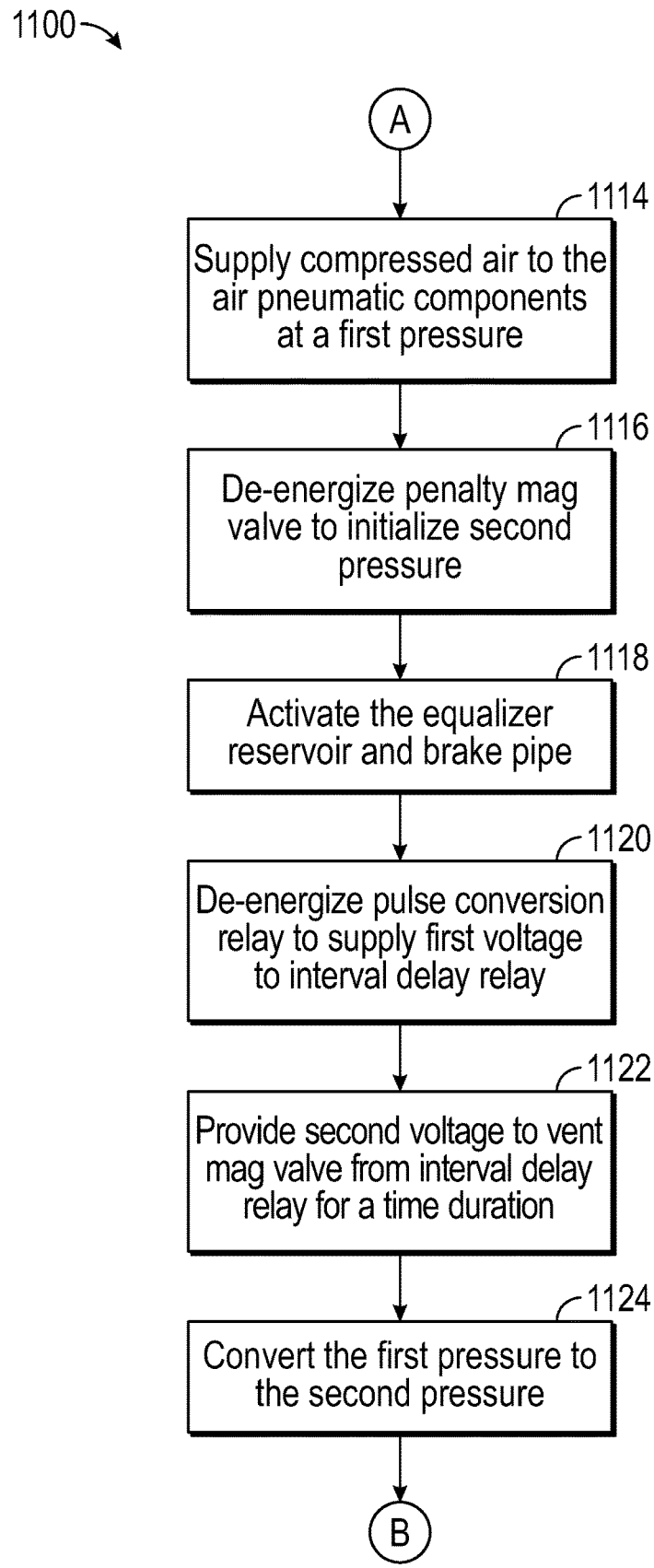
FIG. 3B illustrates a flowchart exemplifying an emergency application control logic, in accordance with one or more embodiments of the present disclosure.
Figure 3C:
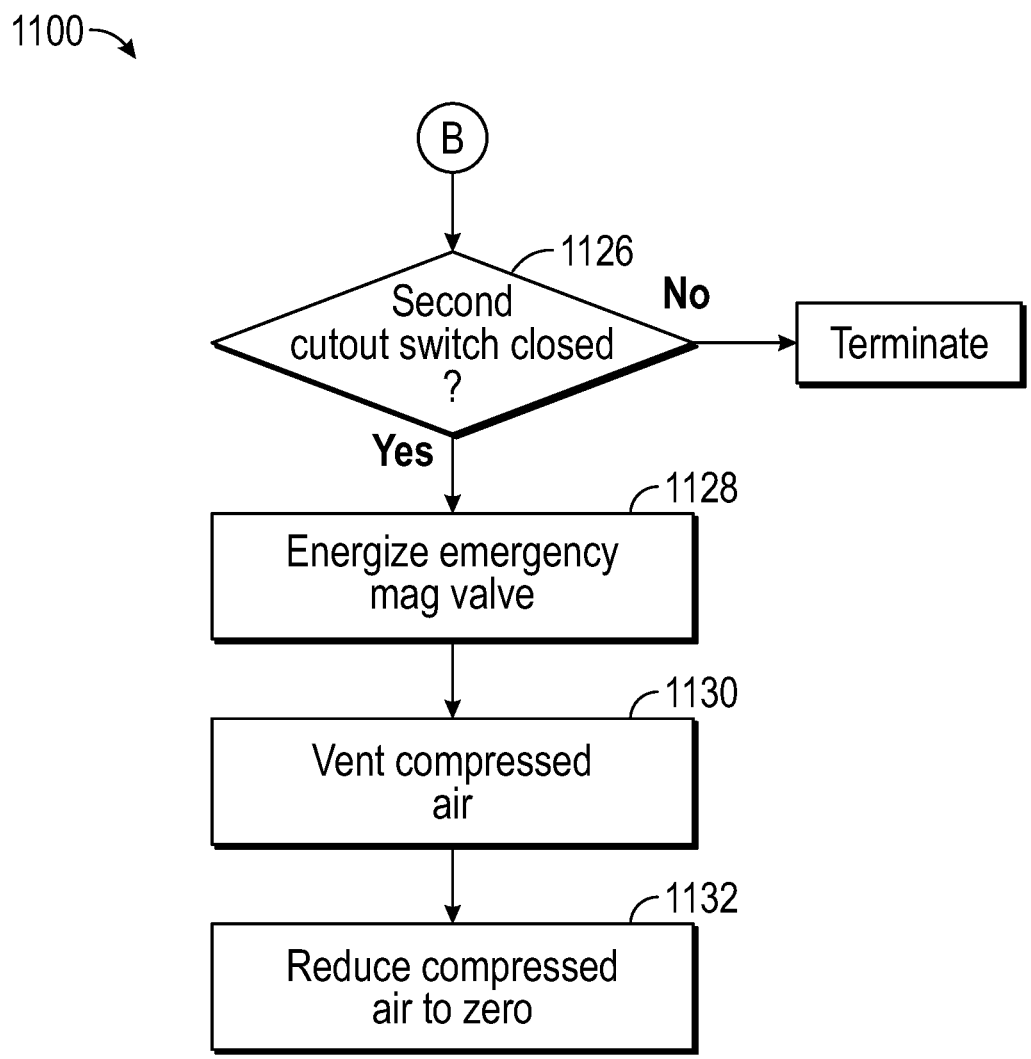
FIG. 3C illustrates a flowchart exemplifying an emergency application control logic, in accordance with one or more embodiments of the present disclosure.

FIGS. 3A-C illustrate a flowchart exemplifying an emergency application control logic 1100, in accordance with one or more embodiments of the present disclosure. The emergency application control logic 1100 can be implemented as an algorithm on the TMC, a machine learning module, a client, a database, or other suitable system. Additionally, the emergency application control logic 1100 can implement or incorporate one or more features of the PTC simulation system 200, including the display management system 202, communication system 204, locomotive control stand system 206, and simulation system 208. The emergency application control logic 1100 can be achieved with software, hardware, firmware, assembly language, machine instructions, an API, a network connection, a network transfer protocol, HTML, DHTML, JavaScript, Dojo, Ruby, Rails, other suitable applications, or a suitable combination thereof.

The emergency application control logic 1100 can leverage the ability of a computer platform to spawn multiple processes and threads by processing data simultaneously. The speed and efficiency of the emergency application control logic 1100 can be greatly improved by instantiating more than one process. However, one skilled in the art of programming will appreciate that use of a single processing thread may also be utilized and is within the scope of the present disclosure.

In one embodiment, commands or data can be received via user input generated on a display or client, such as a screen tap, swipe, mouse click, key press, voice command, or other suitable mechanism. In another embodiment, the inspection commands or data can include inspection data having one or more fields, parameters, characteristics, or metadata, related to an inspection. The emergency application control logic 1100 then proceeds to step 1102.

At step 1102, in one embodiment, the control logic 1100 can receive at least one input. For example, the at least one input can correspond to a train penalty condition. In another example, the train penalty condition can correspond to a PTC application for simulation purposes. The control logic 1100 proceeds to step 1104.

At step 1104, in one embodiment, the control logic 1100 can identify whether the at least one input corresponds with a PTC simulation application. For example, the at least one input can include penalty information, emergency information, and horn information. In an example, the control logic 1100 can receive the at least one input from a computer, such as the TMC 104. The control logic 1100 proceeds with step 1106.

At step 1106, in one embodiment, the control logic 1100 can determine whether the at least one input is a penalty warning. For example, the penalty warning corresponds with the PTC simulation application. If the at least one input is the penalty warning, the control logic 1100 proceeds to step 1108. If the at least one input is not the penalty warning, the control logic 1100 proceeds to exit the process.

At step 1108, in one embodiment, the control logic 1100 can receive an instruction corresponding to the penalty warning. For example, the instruction can include information about the control logic 1100 taking an action corresponding to the PTC simulation application. In an example, the instruction can include the action corresponding to the penalty warning. For example, the instruction can instruct an air pneumatic system to activate. The control logic 1100 proceeds with step 1110.

At step 1110, in one embodiment, the control logic 1100 can determine whether a first cutout switch is closed. For example, the first cutout switch can indicate whether a circuit driving the penalty application is active. In an example, the first cutout switch can be closed when no errors exist corresponding to the PTC simulation. If the first cutout switch is closed, the control logic 1100 proceeds with step 1112. If the first cutout switch is open, the control logic 1100 proceeds to terminate the process.

At step 1112, in one embodiment, the control logic 1100 can energize air pneumatic components. For example, the air pneumatic components can include a pulse conversion relay, a penalty magnetic valve, an interval delay relay, and a vent magnetic valve. In another example, the control logic 1100 generate electrical signals to energize the air pneumatic components. The control logic 1100 then proceeds to step 1114.

At step 1114, in one embodiment, the control logic 1100 can supply compressed air to the air pneumatic components at a first pressure. For example, the control logic 1100 can supply the compressed air to the air pneumatic components at the first pressure for a penalty period. In an example, the air pneumatic components can include one or more pressure transducers. In an example, the one or more pressure transducers can include an equalizer reservoir pressure transducer and a brake pipe transducer. In another example, the first pressure can be 90 psi. In another example, the penalty period can correspond to a service rate to safely alter compressed air pressure. The control logic 1100 the proceeds to step 1116.

At step 1116, in one embodiment, the control logic 1100 can deenergize the penalty magnetic valve to initialize a second pressure. For example, the second pressure can be 58 psi. In another example, the control logic 1100 can terminate an electrical signal to deenergize the penalty magnetic valve. The control logic 1100 the proceeds to step 1118.

At step 1118, in one embodiment, the control logic 1100 can activate the equalizer reservoir pressure transducer and the brake pipe transducer. For example, the control logic 1100 can generate an electrical signal to activate the equalizer reservoir pressure transducer and the brake pipe transducer. The control logic 1100 the proceeds to step 1120.

At step 1120, in one embodiment, the control logic 1100 can deenergize a pulse conversion relay to supply a first voltage to an interval delay relay. For example, the control logic 1100 can terminate the electrical signal to the pulse conversion relay to deenergize. In another example, the first voltage can be 74 volts. The control logic 1100 the proceeds to step 1122.

At step 1122, in one embodiment, the control logic 1100 can provide a second voltage from the interval delay relay to the vent magnetic valve for a time duration. For example, the control logic 1100 can control a signal from the interval delay relay to the vent magnetic valve for the time duration. In an example, the time duration can be 7 seconds. In another example, the second voltage can be 74 volts. The control logic 1100 the proceeds to step 1124.

At step 1124, in one embodiment, the control logic 1100 can convert the first pressure to the second pressure. For example, convert the first pressure to the second pressure to simulate a train penalty condition. In an example, the control logic 1100 can control the air pneumatic components to reduce the first pressure to the second pressure at the service rate. For example, the service rate can correspond with a pressure change rate from the first pressure to the second pressure based on various mechanical factors. The control logic 1100 proceeds to step 1126.

At step 1126, in one embodiment, the control logic 1100 can determine whether a second cutout switch is closed. For example, the second cutout switch can indicate whether a circuit driving the penalty application is active. In an example, the second cutout switch can be closed when no errors exist corresponding to the PTC simulation. If the second cutout switch is closed, the control logic 1100 proceeds with step 1128. If the second cutout switch is open, the control logic 1100 proceeds to terminate the process.

At step 1128, in one embodiment, the control logic 1100 can energize an emergency magnetic valve. For example, the control logic 1100 generate electrical signals to energize the air pneumatic components. The control logic 1100 proceeds to step 1130.

At step 1130, in one embodiment, the control logic 1100 can vent the compressed air. For example, the control lotic can generate the electrical signals to indicate to the emergency magnetic valve to open, releasing any stored compressed air. The control logic 1100 proceeds to step 1132.

At step 1132, in one embodiment, the control logic 1100 can reduce the second pressure. For example, the control logic 1100 can reduce the second pressure to 0 psi. In another example, when the control logic 1100 vents the compressed air, a brake system of a locomotive or simulated locomotive engages applying the emergency application.

Figure 4:
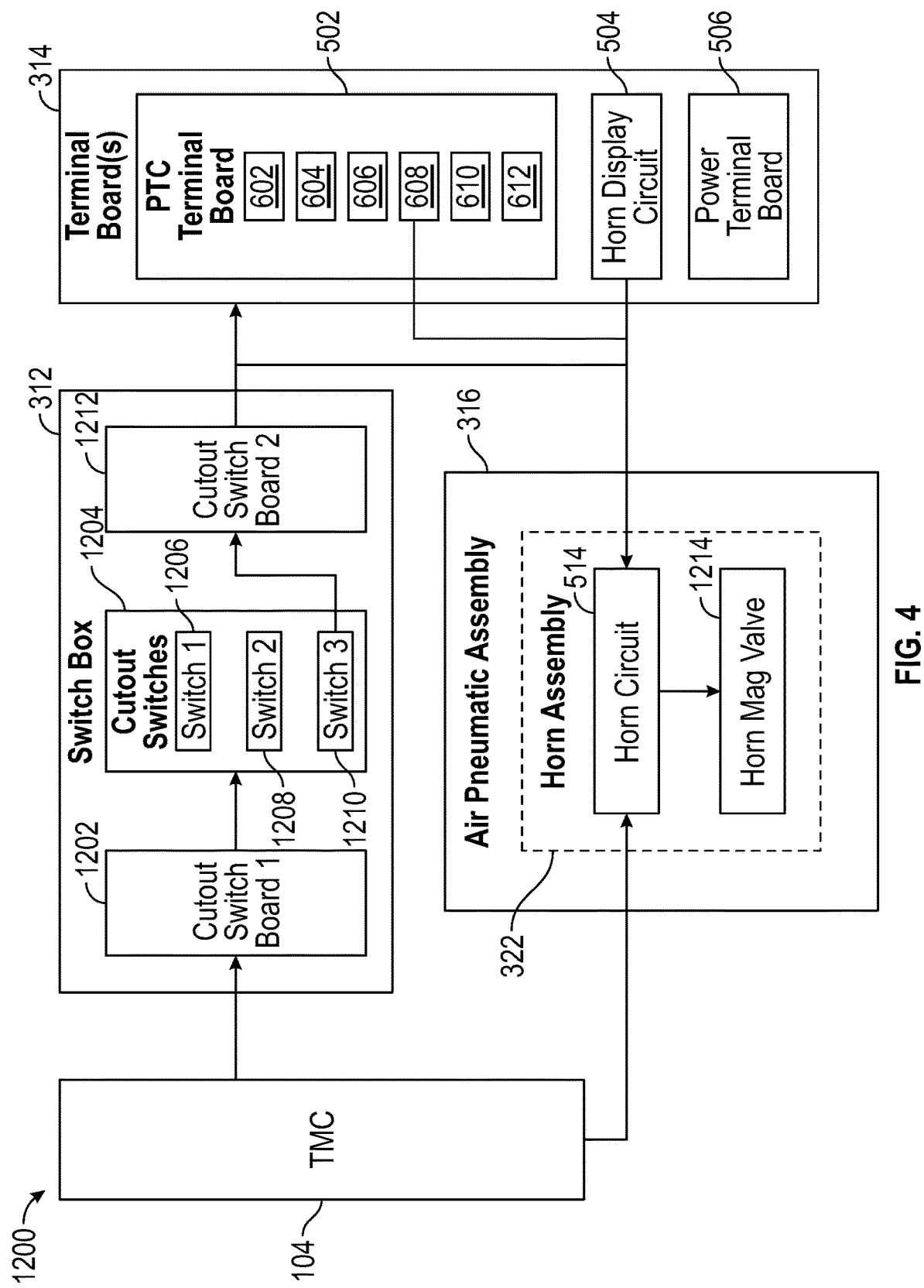
FIG. 4 illustrates a block diagram exemplifying a horn application assembly, in accordance with one or more embodiments of the present disclosure.

FIG. 4 illustrates a block diagram exemplifying a horn application assembly 1200, in accordance with one or more embodiments of the present disclosure. The horn application assembly 1200 can include the TMC 104, the switch box 312, the terminal board(s) 314, and the pneumatic air assembly 316, all operably coupled together. The pneumatic air assembly 316 can include the horn assembly 322, including the horn circuit 514 and a horn magnetic valve 1214. The switch box 312 can include a first cutout switch board 1202, a plurality of cutout switches 1204 including switches 1206, 1208, and 1210, and a second cutout switch board 1212. The terminal board(s) 314 can include a PTC terminal board 502, a horn display circuit 504, and a power terminal board 506. The PTC terminal board 502 can include terminals 602-612.

The aforementioned system components can be coupled through electrical or mechanical means. For example, the TMC 104, second cutout switch board 1212, terminal 608, and horn display circuit 504 can operably couple with the horn circuit 514 using electrical components. In an example, the electrical components can include conductive wire to transfer electrical signals (e.g., the electrical signals indicating a transfer of information and/or power). In another example, the air compressor 512, the penalty magnetic valve 516, the vent magnetic valve 518, and the penalty assembly 318 can interconnect with mechanical components to transfer compressed air (i.e., designated in FIG. 4 with dash dot lines). In an example, the mechanical components can include rigid or flexible hose, made of various types of material.

The first cutout switch board 1202 can include an insulating slab on which electronic terminals are mounted. For example, the first cutout switch board 402 can include one of various materials commonly used as the insulating slab. In an example, the insulating slab can include materials such as polyester, teflon, silicon wafer, among other insulating materials. In another example, the electronic terminals can include inputs or outputs from various electronic components used in the simulation assembly 300. In an example, the inputs and outputs can include copper terminals from switches, relays, or some other electronic component. In another example, the first cutout switch board 402 can provide an interface between the TMC 104 and the cutout switches 1204. For example, the first cutout switch board 402 is physically coupled to each of the cutout switches 1204 using a conductive material. In another example, the first cutout switch board 402 can route a plurality of inputs from the TMC 104 as outputs to the cutout switches 1204 based on a circuit schematic of the simulation assembly 300.

The cutout switches 1204 can include at least one electric switch that isolates a circuit or piece of equipment after the current has been interrupted. For example, the cutout switches 1204 can include the switches 1206, 1208, and 1210.

The switches 1206, 1208, and 1210 can indicate whether the PTC system simulation is applying a penalty, emergency, or horn application based on states of the switches 1206, 1208, and 1210. For example, the switches 1206, 1208, and 1210 can correspond to the application from the PTC simulation system. In an example, the application from the PTC simulation system can correspond to an "on" state when the application is enabled, and an "off" state when the application is disabled. In another example, the switches 1206, 1208, and 1210 can include electrical switches, electromechanical switches, relays among other types of switches. In an example, electrical switches can include an electrical component that can disconnect or connect the conducting path in an electrical circuit, interrupting the electric current or diverting it from one conductor to another. In another example, the switches can operate by process variables such as pressure, temperature, flow, current, voltage, and force, acting as sensors in a process and used to automatically control a system. In another example, the switches can include a relay which can include a switch that is operated by another electrical circuit.

The second cutout switch board 1212 can include another insulating slab on which electronic terminals are mounted. For example, the second cutout switch board 1212 can include one of various materials commonly used as the insulating slab. In an example, the insulating slab can include materials such as polyester, teflon, silicon wafer, among other insulating materials. In another example, the electronic terminals can include inputs or outputs from various electronic components used in the simulation assembly 300. In an example, the inputs and outputs can include copper terminals from switches, relays, or some other electronic component. In another example, the second cutout switch board 1212 can provide an interface between the cutout switches 1204 and the terminal board(s) 314. For example, the second cutout switch board 1212 is physically coupled to each of the cutout switches 1204 using a conductive material. In another example, the second cutout switch board 1212 can route a plurality of inputs from the cutout switches 1204 as outputs to the terminal board(s) 314 based on a circuit schematic of the simulation assembly 300.

The horn magnetic valve 1214 can include an electromechanical magnetic valve to transduce electrical energy to mechanical energy for building and releasing air pressure. For example, the horn magnetic valve 1214 can use magnetic actuation to enhance response time and improve stability positioning. In an example, the horn magnetic valve 1214 can receive at least one input. For example, the at least one input can include an input from the horn circuit 514. In another example, the horn magnetic valve 1214 can include at least one output (not shown). For example, the at least one output can include an output to a horn (not shown). In an example, the at least one output can include a simulated horn (not shown). In another example, the input can instruct the horn magnetic valve 1214 to de-energize. For example, when the horn magnetic valve 1214 receives the instruction to de-energize, the horn magnetic valve 1214 can provide compressed air to the horn to produce an audible sound. In an example, when the horn magnetic valve 1214 receives the instruction to de-energize, the horn magnetic valve 1214 can provide compressed air to a horn system to indicate completion of the horn application.

Figure 5:
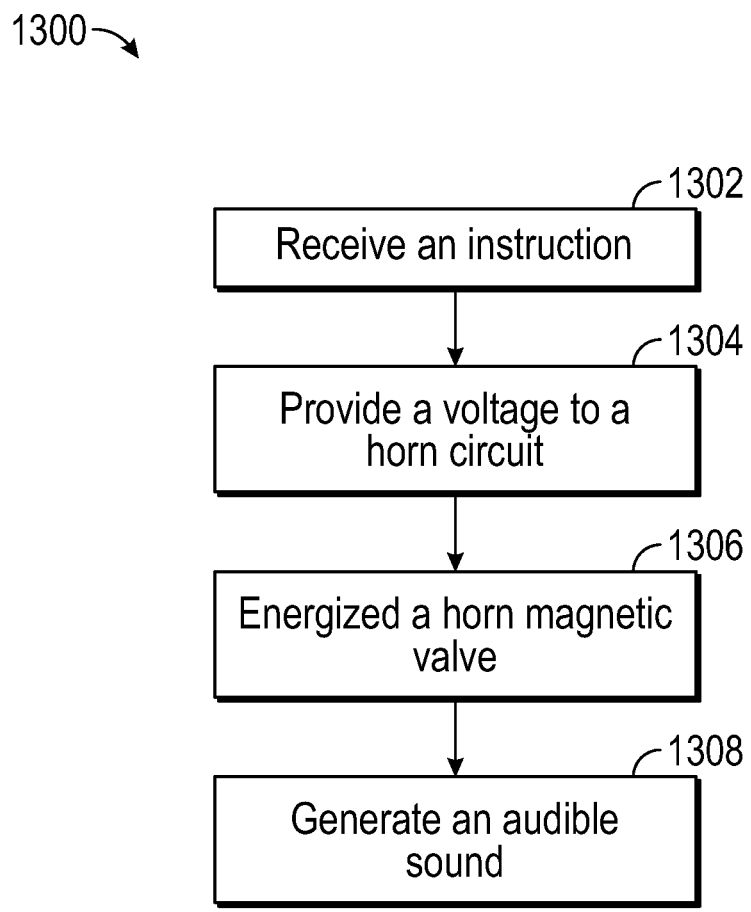
FIG. 5 illustrates a flowchart exemplifying a horn application control logic, in accordance with one or more embodiments of the present disclosure.

FIG. 5 illustrate a flowchart exemplifying a horn application control logic 1300, in accordance with one or more embodiments of the present disclosure. The horn application control logic 1300 can be implemented as an algorithm on a TMC 104, a machine learning module, a client, a database, or other suitable system. Additionally, the horn application control logic 1300 can implement or incorporate one or more features of the PTC simulation system 200, including the display management system 202, communication system 204, locomotive control stand system 206, and simulation system 208. The horn application control logic 1300 can be achieved with software, hardware, firmware, assembly language, machine instructions, an API, a network connection, a network transfer protocol, HTML, DHTML, JavaScript, Dojo, Ruby, Rails, other suitable applications, or a suitable combination thereof.

The horn application control logic 1300 can leverage the ability of a computer platform to spawn multiple processes and threads by processing data simultaneously. The speed and efficiency of the horn application control logic 1300 can be greatly improved by instantiating more than one process. However, one skilled in the art of programming will appreciate that use of a single processing thread may also be utilized and is within the scope of the present disclosure.

In one embodiment, commands or data can be received via user input generated on a display or client, such as a screen tap, swipe, mouse click, key press, voice command, or other suitable mechanism. In another embodiment, the inspection commands or data can include inspection data having one or more fields, parameters, characteristics, or metadata, related to an inspection. The horn application control logic 1300 then proceeds to step 1302.

At step 1302, in one embodiment, the control logic 1300 can receive an instruction. For example, the instruction can correspond to a horn enabled instruction. In another example, the horn enabled instruction can correspond to a PTC application for simulation purposes. In another example, the instruction can include a user input. For example, the user input can indicate a trainee instructs the simulation environment 100 to activate a horn. The control logic 700 proceeds to step 1304.

At step 1304, in one embodiment, the control logic 1300 can provide a voltage to a horn circuit. For example, the horn circuit can include the horn circuit 514. In another example, the control logic 1300 can control a signal from the TMC 104 to the horn circuit 514. In another example, the control logic 1300 can control a signal from the horn display circuit 504 to the horn circuit 514. For example, the horn display circuit 504 can receive an input from the trainee to indicate an instruction to enable the horn. The control logic 1300 the proceeds to step 1306.

At step 1306, in one embodiment, the control logic 1300 can energize a horn magnetic valve. For example, the horn magnetic valve can include the horn magnetic valve 1214. In another example, the control logic 1300 can generate electrical signals to energize the horn magnetic valve. The control logic 1300 then proceeds to step 1308.

At step 1308, in one embodiment, the control logic 1300 can generate an audible sound. For example, the control logic 1300 can activate the horn to generate the audible sound.

Figure 6A:
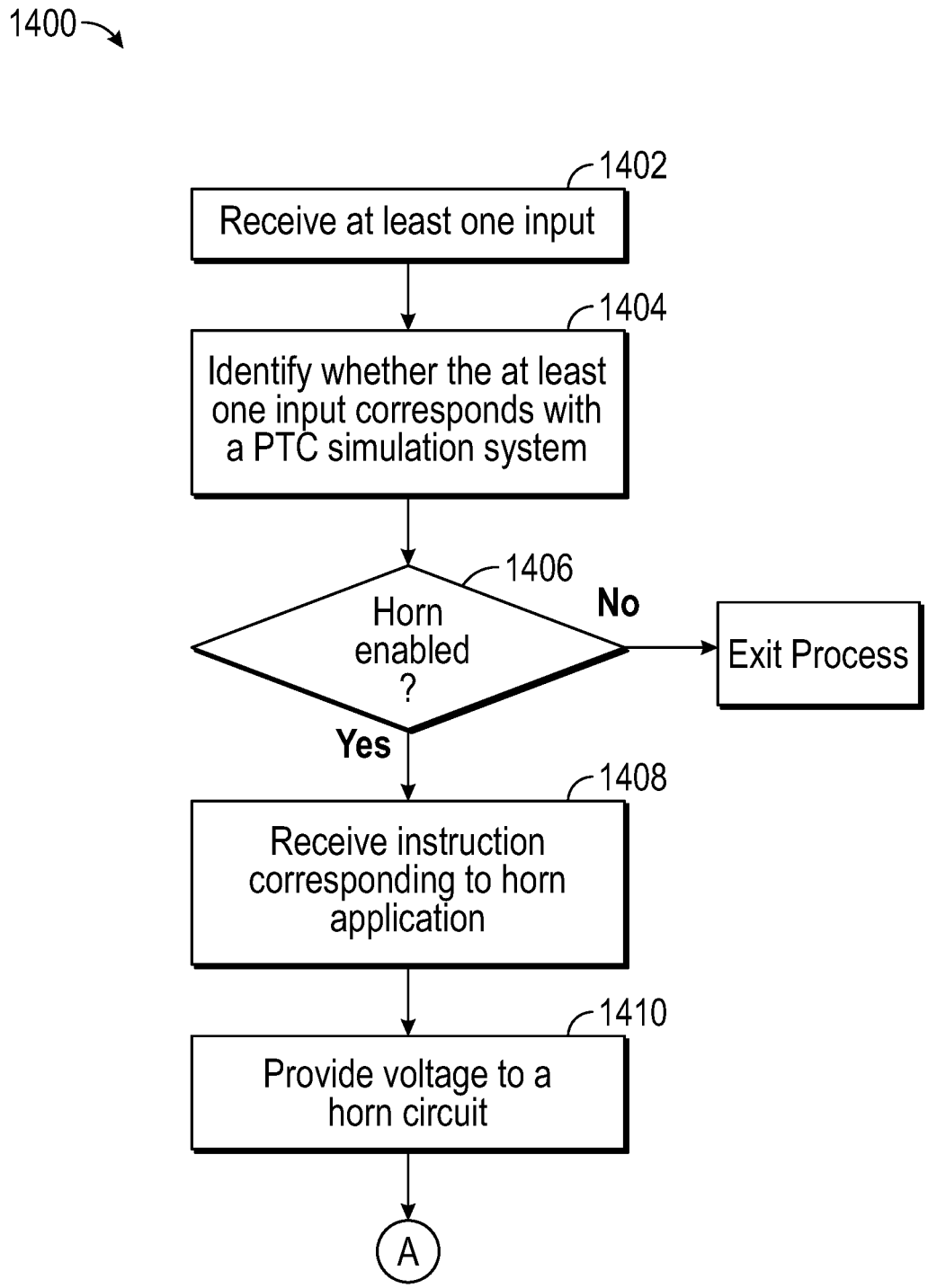
FIG. 6A illustrates a flowchart exemplifying a horn application control logic, in accordance with one or more embodiments of the present disclosure.
Figure 6B:
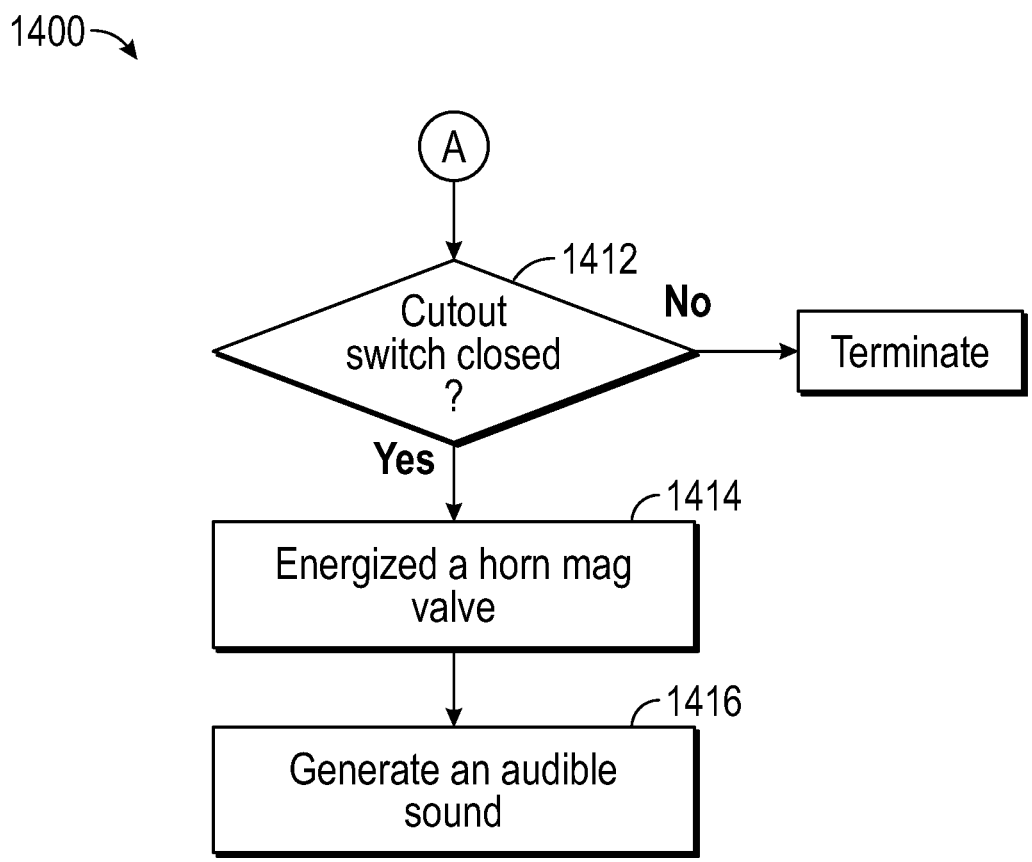
FIG. 6B illustrates a flowchart exemplifying a horn application control logic, in accordance with one or more embodiments of the present disclosure.

FIG. 6A-B illustrate a flowchart exemplifying a horn application control logic 1400, in accordance with one or more embodiments of the present disclosure. The horn application control logic 1400 can be implemented as an algorithm on a TMC 104, a machine learning module, a client, a database, or other suitable system. Additionally, the horn application control logic 1400 can implement or incorporate one or more features of the PTC simulation system 200, including the display management system 202, communication system 204, locomotive control stand system 206, and simulation system 208. The horn application control logic 1400 can be achieved with software, hardware, firmware, assembly language, machine instructions, an API, a network connection, a network transfer protocol, HTML, DHTML, JavaScript, Dojo, Ruby, Rails, other suitable applications, or a suitable combination thereof.

The horn application control logic 1400 can leverage the ability of a computer platform to spawn multiple processes and threads by processing data simultaneously. The speed and efficiency of the horn application control logic 1400 can be greatly improved by instantiating more than one process. However, one skilled in the art of programming will appreciate that use of a single processing thread may also be utilized and is within the scope of the present disclosure.

In one embodiment, commands or data can be received via user input generated on a display or client, such as a screen tap, swipe, mouse click, key press, voice command, or other suitable mechanism. In another embodiment, the inspection commands or data can include inspection data having one or more fields, parameters, characteristics, or metadata, related to an inspection. The horn application control logic 1400 then proceeds to step 1402.

At step 1402, in one embodiment, the control logic 1400 can receive at least one input. For example, the at least one input can include varying electrical signals corresponding to a PTC simulation application. The control logic 1400 proceeds to step 1404.

At step 1404, in one embodiment, the control logic 1400 can identify whether the at least one input corresponds with the PTC simulation application. For example, the at least one input can include penalty information, emergency information, and horn enable information. In an example, the control logic 1400 can receive the at least one input from a computer, such as the TMC 104. The control logic 1400 proceeds with step 1406.

At step 1406, in one embodiment, the control logic 1400 can determine whether the at least one input is a horn enable instruction. For example, the horn enable instruction corresponds with the PTC simulation application. If the at least one input is the horn enable instruction, the control logic 1400 proceeds to step 1408. If the at least one input is not the horn enable instruction, the control logic 1400 proceeds to exit the process.

At step 1408, in one embodiment, the control logic 1400 can receive an instruction corresponding to a horn enable application. For example, the horn enable application can correspond to the PTC simulation application. In an example, the instruction can include information about the control logic 1400 taking an action corresponding to the PTC simulation application. In an example, the instruction can include the action corresponding to the horn enable application. For example, the instruction can instruct a horn on the locomotive or simulation to activate. The control logic 1400 proceeds with step 1410.

At step 1410, in one embodiment, the control logic 1400 can provide a voltage to a horn circuit. For example, the horn circuit can include the horn circuit 514. In another example, the voltage can correspond to the control logic 1400 controlling a signal from the TMC 104 to the horn circuit 514. In another example, the voltage can correspond to the control logic 1400 controlling a signal from the horn display circuit 504 to the horn circuit 514. For example, the horn display circuit 504 can receive an input from the trainee to indicate an instruction to enable the horn. The control logic 1400 the proceeds to step 1412.

At step 1412, in one embodiment, the control logic 1400 can determine whether a cutout switch is closed. For example, the cutout switch can indicate whether a circuit driving the horn enabled application is active. In an example, the cutout switch can be closed when no errors exist corresponding to the PTC simulation application. If the cutout switch is closed, the control logic 1400 proceeds with step 1414. If the first cutout switch is open, the control logic 1400 proceeds to terminate the process.

At step 1414, in one embodiment, the control logic 1400 can energize a horn magnetic valve. For example, the horn magnetic valve can include the horn magnetic valve 1214. In another example, the control logic 1400 can generate electrical signals to energize the horn magnetic valve. The control logic 1400 then proceeds to step 1416.

At step 1416, in one embodiment, the control logic 1400 can generate an audible sound. For example, the control logic 1400 can activate the horn to generate the audible sound.

The present disclosure achieves at least the following advantages:

1. simulates events of a PTC system without a locomotive;
2. controls electrical and mechanical components corresponding to similar components found on a locomotive to increase efficiency of training locomotive engineers and conductors;
3. enables simulation of events related to the PTC system in an accurate manner including a penalty application, an emergency application, and a horn application; and
4. optimizes training of locomotive engineers and conductors in a simulated environment to ensure focus on practical safety applications.

Persons skilled in the art will readily understand that these advantages (as well as the advantages indicated in the disclosure) and objectives of this system would not be possible without the particular combination of computer hardware and other structural components and mechanisms assembled in this inventive system and described herein. The algorithms, methods, and processes disclosed herein improve and transform any general-purpose computer or processor disclosed in this specification into a special purpose computer programmed to perform the disclosed algorithms, methods, and processes. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A method for simulating an emergency condition in a positive train control (PTC) system, comprising:
   receiving an instruction corresponding to a train emergency condition;

supplying compressed air to one or more pressure transducers at a first pressure for a penalty period;
converting the first pressure to a second pressure at a penalty rate to simulate the train emergency condition;
energizing an emergency magnetic valve;
venting the compressed air to reduce the second pressure.

2. The method of claim 1, wherein the first pressure is 90 pounds per square inch (psi), and wherein the second pressure is 58 psi.

3. The method of claim 1, wherein the penalty rate is based on a service rate.

4. The method of claim 1, further comprising energizing the emergency magnetic valve.

5. The method of claim 1, further comprising energizing a pulse conversion relay, a penalty magnetic valve, an interval delay relay, and a vent magnetic valve.

6. The method of claim 5, further comprising deenergizing the pulse conversion relay to supply a first voltage to the interval delay relay.

7. The method of claim 6, further comprising providing a second voltage to the vent magnetic valve from the interval delay relay for a time duration.

8. The method of claim 7, wherein the first voltage and the second voltage are 74 volts.

9. The method of claim 5, further comprising deenergizing the penalty magnetic valve to initialize the second pressure.

10. The method of claim 1, wherein the one or more pressure transducers include an equalizer reservoir pressure transducer and a brake pipe pressure transducer.

11. The method of claim 10, further comprising activating the equalizer reservoir pressure transducer and the brake pipe pressure transducer.

12. A system for simulating an emergency condition in a positive train control (PTC) system, comprising:
an internal delay relay operably coupled to a PTC terminal board;
a pulse conversion relay operably coupled to the internal delay relay and the PTC terminal board;
an air compressor operably coupled to the pulse conversion relay;
a penalty magnetic valve operably coupled to the air compressor;
at least one brake pipe pressure transducer operably coupled to the penalty magnetic valve;
a brake cylinder pressure transducer operably coupled to the penalty magnetic valve;
a vent magnetic valve operably coupled to the penalty magnetic valve and the internal delay relay;
an emergency magnetic valve operably coupled to the PTC terminal board; and
wherein the system controls compressed air being applied to the at least one brake pipe pressure transducer and the brake cylinder pressure transducer.

13. The system of claim 12, wherein the system further comprises:
an equalizing reservoir pressure transducer operably coupled to the penalty magnetic valve; and
a reservoir operably coupled to the penalty magnetic valve and the emergency magnetic valve.

14. The system of claim 13, wherein the penalty magnetic valve provides compressed air to the equalizer reservoir pressure transducer and the at least one brake pipe pressure transducer.

15. The system of claim 14, wherein the compressed air is 90 psi when the penalty magnetic valve is active, and wherein the compressed air is 58 psi when the penalty magnetic valve is inactive.

16. The system of claim 12, wherein the air compressor provides compressed air to the brake cylinder pressure transducer.

17. The system of claim 16, wherein the compressed air is 72 pounds per square inch (psi).

18. The system of claim 12, wherein the vent magnetic valve includes a choke.

19. The system of claim 12, wherein the emergency magnetic valve includes an exhaust.

20. A method for simulating a horn enabled condition in a positive train control (PTC) system, comprising:
receiving an instruction corresponding to the horn enabled condition;
providing a voltage to a horn circuit; and
generating an audible sound using a horn based on compressed air released by a horn magnetic valve.

21. The method of claim 20, wherein the instruction is a user input.

22. The method of claim 20, wherein the instruction is an input from a train management computer (TMC).

23. The method of claim 22, further comprising energizing the horn magnetic valve.

24. A system for simulating a horn enabled condition in a positive train control (PTC) system, comprising:
a horn magnetic valve operably coupled to a horn circuit;
the horn circuit operably coupled to a horn display circuit,
wherein the system controls compressed air applied to at least one brake pipe pressure transducer and a brake cylinder pressure transducer.

25. The system of claim 24, wherein the system further comprises:
a train management computer (TMC) operably coupled to the horn circuit;
a switch box operably coupled to the TMC and the horn circuit;
at least one terminal board operably coupled to the switch box and the horn circuit,
wherein the system controls compressed air being applied to the at least one brake pipe pressure transducer and the brake cylinder pressure transducer.

* * * * *